Nov. 28, 1933.  R. HIGGINS  1,937,148
ELECTRICAL APPARATUS
Filed Oct. 17, 1932  2 Sheets-Sheet 1

INVENTOR
Ralph Higgins
BY Alpheus J. Crane
ATTORNEY

Nov. 28, 1933.     R. HIGGINS     1,937,148
ELECTRICAL APPARATUS
Filed Oct. 17, 1932     2 Sheets-Sheet 2

INVENTOR
Ralph Higgins
BY Alpheus J. Crane
ATTORNEY

Patented Nov. 28, 1933

1,937,148

UNITED STATES PATENT OFFICE 1,937,148

ELECTRICAL APPARATUS

Ralph Higgins, Akron, Ohio, assignor to The Ohio Brass Company, Mansfield, Ohio, a corporation of New Jersey Application October 17, 1932. Serial No. 638,109

12 Claims. (Cl. 175—358)

This invention relates to connections or taps for diverting relatively small amounts of energy from high potential transmission lines for metering, relay operation, synchronizing and like purposes, and particularly to the form of connection between condensers and transformers used in combination with each other for this purpose.

One object of the invention is to provide a simplified construction in which the condenser is mounted directly on the transformer housing, thus eliminating the supporting insulator for the condenser and the entrance bushing for the transformer heretofore used, and also avoiding any external leads between the condenser and transformer and preventing leakage of the charging current and consequent erratic performance, especially under adverse weather conditions.

A further object of the invention is to provide a device which shall be economical to manufacture and easy to assemble, and which shall be of improved construction and operation.

Other objects and advantages will appear from the following description.

The invention is exemplified by the combination and arrangement of parts shown in the accompanying drawings and described in the following specification, and it is more particularly pointed out in the appended claims.

Figure 1:
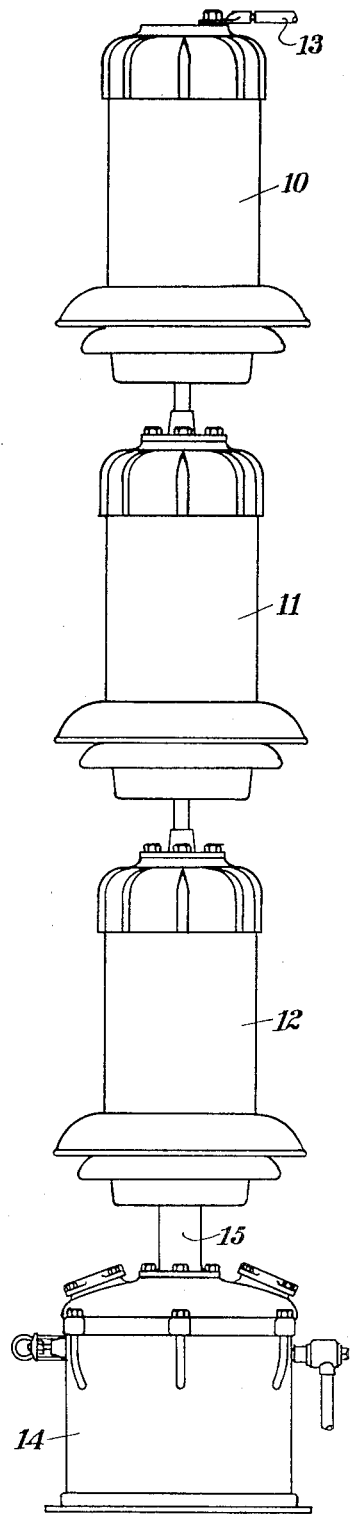
Fig. 1 is an elevation of a capacitance coupling and step-down transformer connected according to the present invention.

As shown in Fig. 1, the numerals 10, 11 and 12 designate a plurality of condenser units mounted in series, one upon the other, and arranged to be connected to a high potential line by a jumper 13 connected to the uppermost condenser. It will be understood that any number of units desired may be connected in the stack. The units may be similar to those shown in Patent #1,810,385 granted June 16, 1931 to A. O. Austin. The numeral 14 designates a transformer housing containing a step-down transformer, one terminal of the primary of which is connected through the capacitance members 10, 11 and 12 to the transmission line; the other terminal of the primary being grounded. The secondary of the transformer is connected to the measuring instrument or other electrical translating device to be energized from the current supplied by the transformer.

Figure 2:
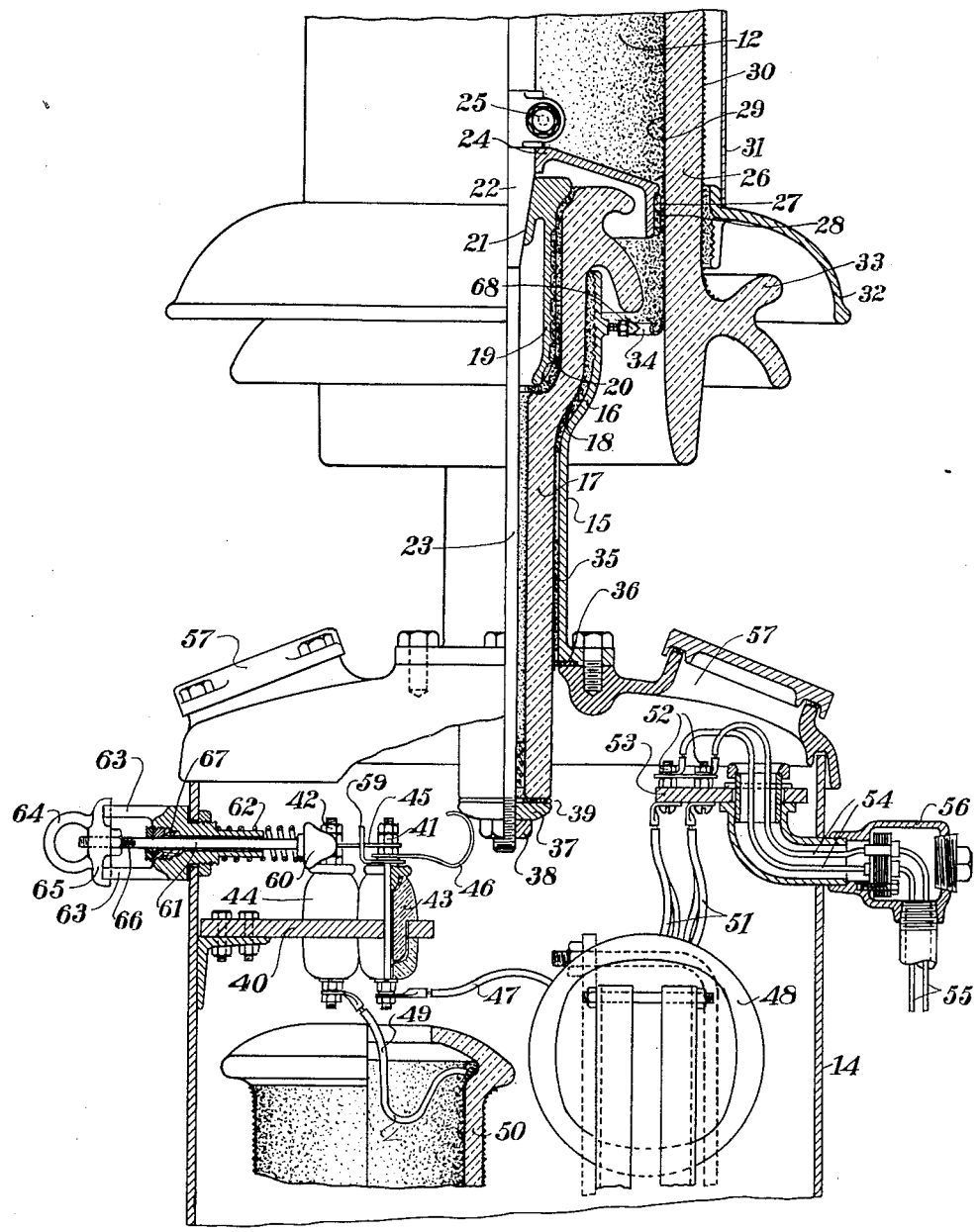
Fig. 2 is a fragmentary elevation, partly in section, of a portion of the device in Fig. 1, showing the connection between the lower condenser unit and the transformer.

Mounted on the transformer housing 14 is a sleeve 15, which, as shown in Fig. 2, extends into the condenser 12 and is provided with an enlarged portion 16 which supports an insulator bushing 17 of porcelain or other suitable dielectric material. The bushing 16 has the upper portion thereof enlarged to fit within the enlargement 16 and is connected to the inside of the enlarged portion 16 by a suitable cement joint 18. A metal thimble 19 is secured to the interior of the bushing 17 by a suitable cement joint 20 and the thimble 19 has a tapered seat 21 which receives a tapered portion 22 of the central supporting pin 23 for the condenser 12. A spider 24 is clamped to the pin 22 by a clamping bolt 25 and the spider is connected to the porcelain member 26 of the condenser 12 by means of a cement joint 27 and a cork or other yielding gasket 28.

The inner surface of the porcelain member 26 is provided with a metal coating 29 which is in electrical connection with the spider 24 and the pin 23, forming the inner metallic element of the condenser. The outer surface of the porcelain member 26 is also metalized at 30 and is provided with an outer metal housing 31 and a metal flange or petticoat 32; the housing 31 and petticoat 32 forming the outer metal element of the condenser. The porcelain member 26 may be provided with suitable flanges or petticoats 33 for preventing leakage, and an upwardly turned metal bead 34 is preferably provided at the lower edge of the coating 29 to prevent corona and leakage from the edge of the metallized surface. The outer and inner faces of the bushing 17 are also preferably metallized to furnish additional capacitance in parallel with the transformer primary and to reduce radio interference. A resilient joint may be provided at 35 between the bushing 17 and the sleeve 15, and a gasket is also provided at 36 to insure a tight joint where the bushing 17 enters the transformer housing 14. The lower end of the pin 23 is threaded and provided with a suitable washer 37 and nut 38 to clamp the parts in place; a gasket 39 being inserted between the washer 37 and the lower end of the bushing 17. A supporting shelf 40 is mounted inside the housing 14 and is provided with terminal posts 41 and 42, mounted on insulators 43 and 44 respectively. The terminal posts 41 and 42 are connected by a conducting link 45, and a metal spring 46 connects these posts to the lower end of the pin 23. Of course, a flexible or other form of connection could be used between the pin and terminal posts, but the spring shown permits convenient assembly and assures good electrical contact. One of the terminal posts 41 is connected by a jumper 47 to the primary winding of the transformer 48, and the other post 41 may be connected by a jumper 49 to a condenser 50 for phase angle correction as explained more fully and claimed in my prior application, Serial Number 619,009, filed June 24, 1932. The secondary leads 51 from the transformer 48 may be connected to binding posts 52 on a board 53 from which leads 54 extend to the external connections 55 through a suitable outlet box 56, and hand holes 57 and 58 may be provided to give access to the interior of the transformer housing 14.

An arcing gap consisting of terminal members 59 and 60 is provided between the post 41 and the grounded housing 14 to protect the transformer winding from excessive surges coming in from the transmission line over the condenser stack. The terminal member 60 is mounted on a plunger 61 which is pressed toward the terminal 59 by a spring 62. The terminal 60 is held in its spaced relation with the terminal 59 by stops 63 but by pulling slightly on the eye 64 and rotating the plunger 61 through a slight angle, the head 65 may be freed from the stops 63 so that the terminal 60 may move into contact with the terminal 59, thus grounding the incoming lead for the transformer 48. The amplitude of the arcing gap may be adjusted by threads 66 on the plunger 61. A packing gland 67 is provided for the plunger 61 to exclude moisture from the interior of the housing 14. A supplemental gap 68 is provided between the sleeve 15 and the bead 35 and if for any cause it is not desirable to permit arcing within the housing 14, the gap terminal 60 may be set far enough away from the terminal 59 that arcing will occur only at the gap 68 and not at 59—60. In this case 60 will be used only as a grounding switch.

The entire connection from the condenser to the transformer is so enclosed that it is protected from weather conditions and there is no chance for leakage to ground, which would be affected by rain, fog or other atmospheric moisture.

The pin 23 forms a rigid connection between the transformer housing and the insulator stack so that the stack is firmly supported and braced both by the sleeve 15 and the pin 23. The tapered bearing 22 on the pin 23 provides easy means of assembly and an efficient support for the condenser stack. Electrical connection from the condenser to the transformer is made entirely within the housing so that there is no exposed entrance lead. The combination ground switch and arcing gap may be easily operated by the usual stick employed by operators for this purpose by simply engaging the stick with the eye 64. Any insulating medium such as air or gas, insulating liquids or compound, may be used within the transformer housing 14, provided of course the terminals of the protective gap are not covered so as to prevent operation of the gap. The position of the protecting gap inside the housing entirely shields this gap from moisture which might cause arcing of the gap when not desired. When the grounding switch is used also as an arcing gap, the insulating material within the housing should be such that it will not give off a combustible gas that might be ignited by arcing at the gap.

I claim:

1. The combination with a condenser, a support for said condenser connected with one of the conductor elements of said condenser, a transformer having its primary winding connected to said support, and a housing for said transformer, said support extending into said housing to permit connection between said support and primary winding entirely within said housing.

2. In combination a condenser comprising a hollow dielectric member, a conductor element disposed within said dielectric member, a housing for electrical apparatus, a conductor electrically connected to the conductor element within said dielectric member and extending from the interior of said dielectric member to the interior of said housing, and a casing for said conductor extending from the interior of said dielectric member to the interior of said housing to protect said conductor from exposure to weather conditions.

3. In combination a condenser comprising a hollow dielectric member, a conductor element disposed within said dielectric member, a transformer housing, means for supporting said condenser on said transformer housing, and a conductor electrically connected to the conductor element within said dielectric member and extending into said transformer housing, and a bushing for insulating said conductor from said transformer housing, said bushing extending from the interior of said dielectric member to the interior of said housing, and enclosing said conductor to protect said conductor from weather conditions.

4. The combination with a condenser comprising a hollow dielectric member and a conductor element disposed within said dielectric member, of a housing for electrical apparatus, means for supporting said condenser on said housing, and a conductor extending from the interior of said dielectric member to the interior of said housing and enclosed in said supporting means.

5. The combination with a condenser having an enclosed conductor element, of a housing for electrical apparatus, means for supporting said condenser on said housing, and a conductor extending from the interior of said condenser to the interior of said housing and enclosed in said supporting means.

6. The combination with a condenser having an enclosed conductor element, of a housing for electrical apparatus, means for supporting said condenser on said housing, a conductor connected with the enclosed element of said condenser and extending through said supporting means, said supporting means comprising a dielectric bushing surrounding said conductor and insulating said conductor from said housing and protecting said conductor from weather conditions.

7. The combination with a condenser comprising a hollow dielectric member, and a conductor element disposed within said member, of a transformer housing, means for supporting said condenser on said transformer housing, said supporting means comprising a dielectric bushing, means for supporting said bushing on said housing, and a support for said condenser carried by said bushing.

8. The combination with a condenser comprising a hollow dielectric member having a conductor element disposed within said member, of a transformer housing, and means for supporting said condenser on said housing, said supporting means comprising a pin electrically connected with the condenser element within said dielectric member and supporting said dielectric member, a dielectric bushing supporting said pin, and a metal sleeve mounted on said housing and supporting said bushing, said pin being extended through said bushing to the interior of said transformer housing.

9. The combination with a condenser comprising a hollow dielectric member and a conductor element disposed within said dielectric member, of a housing for electrical apparatus, a conductor extending from the interior of said dielectric member to the interior of said housing for connecting the inner element of said condenser with apparatus within said housing, and an enclosed arcing gap connected with said conductor for protecting the apparatus within said housing.

10. The combination with a condenser comprising a hollow dielectric member and a conductor element disposed within the interior of said dielectric member, of a grounded support for said condenser extending into the interior of said dielectric member, and an arcing gap between said grounded support and said conductor element disposed within said dielectric member and protected by said dielectric member from atmospheric moisture.

11. The combination with a condenser comprising a hollow dielectric member and a conductor element disposed within said dielectric member, of a transformer housing, means for supporting said condenser on said housing, a conductor extending from said condenser to the interior of said housing, and an arcing gap disposed within said housing and connected with said conductor.

12. The combination with a condenser, of a transformer housing supporting said condenser, a transformer disposed within said housing and electrically connected with said condenser, and a combined grounding switch and arcing gap disposed within said housing and having one terminal thereof connected with said condenser and the primary of said transformer, and the other terminal thereof grounded.

RALPH HIGGINS.